Figure 1:
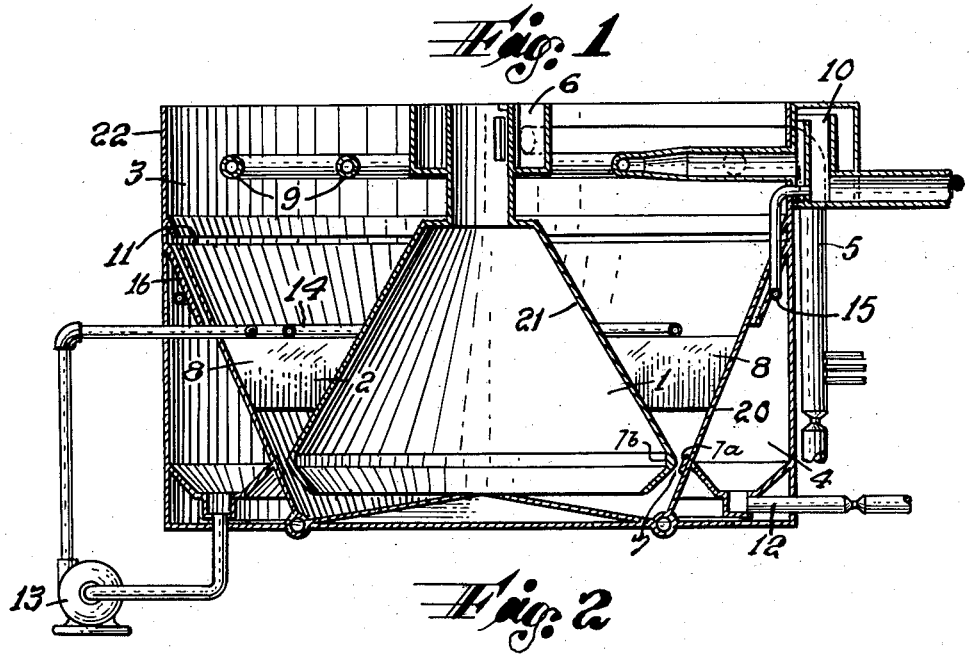

Jan. 24, 1961  V. MACKRLE ET AL  2,969,149
REACTOR FOR WATER PURIFICATION
Filed May 19, 1958  2 Sheets-Sheet 1

INVENTORS.
Vladimír Mackrle
Svatopluk Mackrle
BY Igor Tesařík
Vladimír Mičan

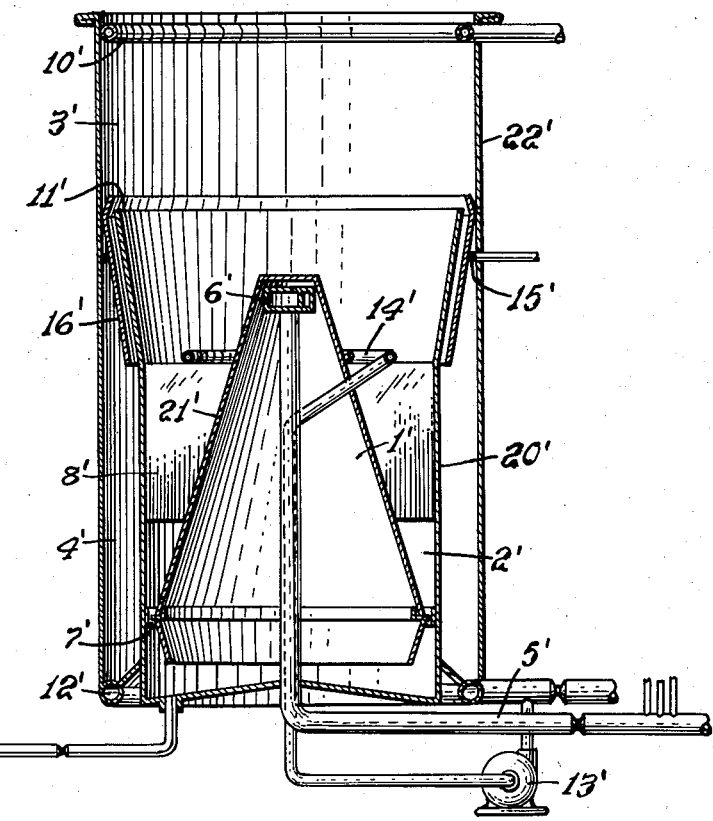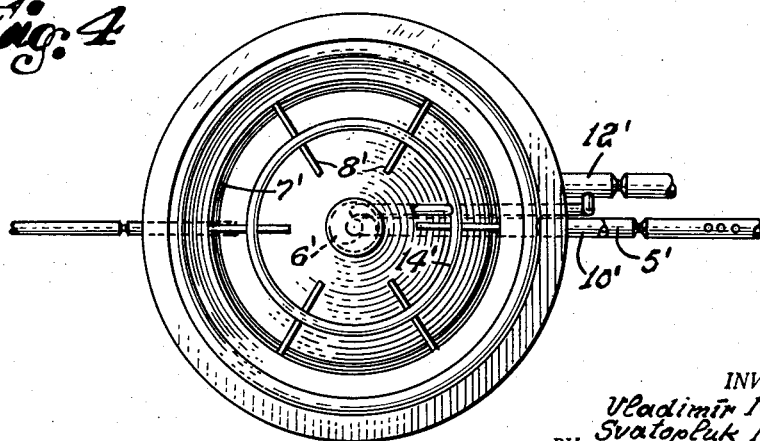

2,969,149
REACTOR FOR WATER PURIFICATION
Vladimír Mackrle, Svatopluk Mackrle, Igor Tesařík, and Vladimír Mičan, all of Brno, Czechoslovakia, assignors to Královopolská strojírna, Závody Chemických zařízení, národní podnik, Brno, Czechoslovakia
Filed May 19, 1958, Ser. No. 736,352
10 Claims. (Cl. 210—195)

The known reactors for the purification of surface water by means of a suspended flocculation layer produced by precipitating the impurities require large containers for mixing the water with the precipitants, and for the formation of large flocks which settle well, and for their settling and removal. Such reactors are equipped with complicated mixing and scraping devices, the housing of which, together with the associated driving mechanisms, requires special covering buildings. The inevitable protraction of the operations which is based on the settling leads to slow rates of flow and hence to low outputs for such reactors.

The said disadvantages are reliably overcome by the simple reactor for water purification by means of turbulent floc filter bed, which consists of separate compartments for precipitation of the flocks, for clarifying the water in the turbulent flocculation layer and finally for concentrating the excess sludge, and which fully utilizes the excellent filtering capacity of the suspended floc filter bed to capture all the precipitated impurities. According to the invention, this is achieved by means of a compact, coaxial arrangement of three containers placed one inside the other, namely an inner, bell-shaped precipitation tank, a middle, funnel-shaped tank for the formation of the floc filter bed and an outer, cylindrical tank, the upper portion of which is adapted for the secondary settling of the water and the bottom for concentrating the sludge and removing the excess. A feed jet mixer is provided in the upper end of the inner bell-shaped tank which comprises, at the bottom, a gap between it and the stilling walls for transferring the water, with the flocks formed, into the middle or clarifying tank which has at its periphery an overflow edge for the sludge to spill over into the concentrating compartment which is provided, on the one hand with a collecting ring for removing the excess quantity of sludge and on the other hand with an outlet for the secondary clarified water, while an outlet or an overflow or both are provided, preferably below the water level of the middle tank for drawing off the main quantity of primary clarified water.

Such a reactor does not require any mechanical equipment, because the movement of the water and the material suspended therein takes place inside the device exclusively by hydraulic pressure, the compartments being perfectly adapted to the operations to be carried out therein. Thus the formation of the flocks takes place during the descending movement of the aqueous mass to the turning point at the base of the inner tank, after which the formation of the floc filter bed takes place in the middle tank during the rising movement of the aqueous mass up to the turning point at the overflow edge, from which point on, the sludge component again executes a downward movement to the bottom of the outer tank while the primary clarified water rises to the surface in the middle tank where it is removed.

Figure 2:
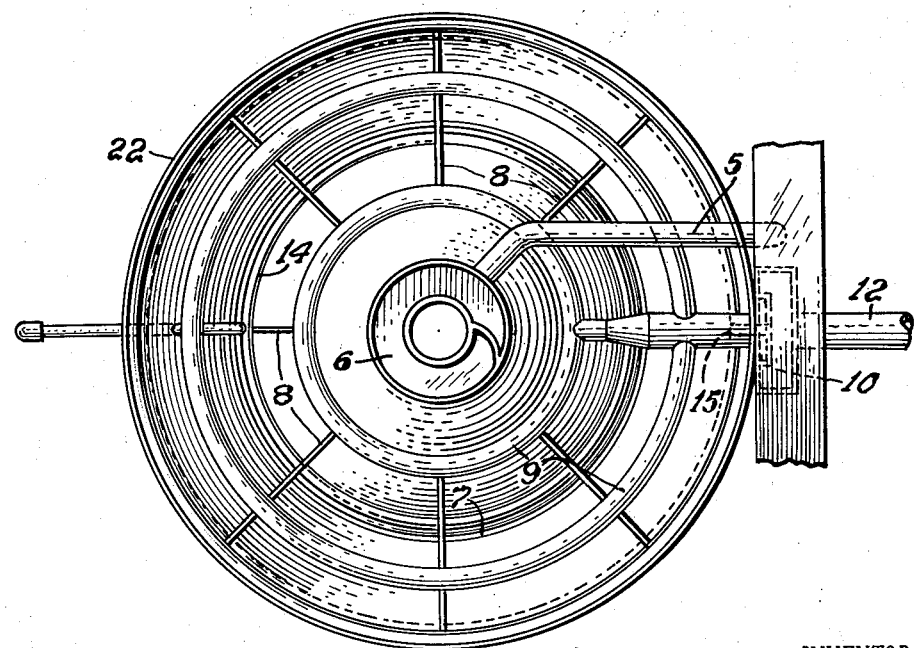

Embodiments of the invention are described below, by way of example, with reference to the drawing, wherein Figures 1 and 2 show a large purification plant in axial section and plan, while Figures 3 and 4 show a small reactor of modified construction, likewise in axial section and plan.

In the embodiment shown in Figures 1 and 2, as a result of the coaxial installation of the middle funnel-shaped tank 20 and its bell-shaped insert 21 in the outer tank 22, three separate compartments are formed, namely the precipitation compartment 1, then the clarifying compartment 2 for the formation of the floc filter bed, which extends upwards into the final settling compartment 3 and downwards into the concentrating compartment 4. The supply pipe 5 ends with the jet mixer 6 in the tip of the bell-shaped compartment 1, the lower periphery of which comprises the gap 7 leading into the compartment 2 with the stilling blades 8 arranged therein. The gap 7 is formed between two narrow circular areas 7a and 7b in the wall of the tank 20 and vessel 21, respectively. The portion of the wall of the bell-shaped vessel 21 above the area 7a and the wall of the funnel-shaped tank 20, both when viewed in cross section and downwardly, converge toward the circular areas 7a and 7b, which makes it possible for the width of the gap 7 to be adjusted, as can clearly be seen from the drawing, merely by lowering or raising the bell-shaped vessel. A slight lowering or raising will bring about the desired adjustment. The flow of purified water through this annular gap 7 is arranged on the principle of flow through a venturi tube, the narrowest slit in which is adjustable in such a manner that the turbulent floc filter bed formed by the rising speed of the water is held in suspension and its downward passage through the gap is prevented. Below the surface of the finally purified primary water is a system of discharge pipes 9 which lead into the collecting trough 10 at the periphery of the outer tank 22.

Between the overflow edge 11 of the middle tank 20 and the wall of the tank 22 is a peripheral gap for the overflow of the sludge into the compartment 4. Near the bottom of this compartment is provided an annular collecting pipe 12 which serves to remove the concentrated sludge. From the annular pipe 12, a branch pipe, with a built-in pump 13, leads into the distributing ring 14 inside the compartment 2. This sludge circulation system is used only for pumping the sludge back into the middle or clarifying compartment to form a floc filter bed when the reactor is first brought into service or when it is again brought into service after a shutdown. The overflow sludge is guided by the edge 11 along a guide wall 16 to a point close to the bottom of the concentrating compartment 4. At the top of this compartment, below the guide wall, an outlet 15 is provided for the purified secondary liquid resulting from the concentration of the sludge.

The embodiment shown in Figures 3 and 4 corresponds to that just described and differs therefrom primarily in that the collecting pipe 10' for purified water and the annular collecting pipe 12' for the removal of the sludge, serve to reinforce the outer tank 22' of the reactor. The width of the gap 7' can be adjusted by lowering or raising of the vessel 21'.

The operation of the device described is as follows:

The raw water with the measured amounts of precipitants is supplied through the pipe 5 to the jet mixer 6 from which it emerges in the top of the precipitation compartment 1, where the perikinetic flocculation takes place with a circular movement of the liquid, then, after passing through the peripheral gap 7 it reaches the compartment 2 in which, after stilling by means of the blades 8, it forms the turbulent floc filter bed. On resumption of interrupted operation, the filter bed is restored by pumping the settled sludge from the compartment 4 into the distributing ring 14 by means of the pump 13. The surface of the floc filter bed is kept at the necessary height by the overflow edge 11, over which the excess sludge falls into the concentration compartment 4 from which it is drawn off, from time to time, through the pipe 12. The water which is finally purified above the floc filter bed in the compartment 3, is drawn off through the ring 9 into the trough 10 from which it is continuously drawn off and supplied to the filters. The reactor according to the invention has numerous advantages. As a result of the compact arrangement of only three tanks, of which it is composed, its working space is fully utilized and the output of the plant is increased by the omission of the flocculation phase. As distinct from the known reactors, in which the separate compartments are adapted both for the peri- and for the orthokinetic flocculation phases, the reactor according to the invention only uses the perikinetic flocculation phase which only leads to the formation of microflocks, while the orthokinetic phase is avoided completely and the macroflocks are formed by agglomeration of the microscopic flocks in the turbulent floc filter bed of the clarifying compartment. As a result, the reactor is simplified and its output increased. The floc filter bed, which is formed in the maximum diameter of the reactor, is utilized for the filtration of the water to be purified. The overflow edge automatically holds the surface of the filter bed at a constant height, and the filter bed is constantly renewed by the supply of fresh flocks and the overflow of the excess amount of flocks at the surface of the filter bed. At the same time, the lateral compartment of the reactor is fully utilized for the concentration of the sludge, by settling, with the withdrawal of purified secondary liquid which is conveyed to the filters.

As a result, it is possible to remove the sludge at long intervals and low water losses are assured. The omission of mechanical mixing and scraping mechanisms, together with their drives, which are mounted above the actual reactors, permits the construction of reactors according to the invention without protective buildings, and they are merely covered to avoid contamination. The collector ring for the discharge of the purified water is sufficiently deep below the water level to permit operation of the reactors even in a severe frost.

We claim:

1. In a reactor for water purification by means of a suspended floc filter bed, in combination, a tank having an upper portion defining a settling zone; a first inclined wall in a lower portion of said tank, said wall having an upper edge portion closely adjacent said tank so as to form a sludge overflow passage therewith, and a lower portion spaced from said tank so as to define a sludge concentrating zone between said wall and said tank; a second inclined wall in said tank and extending into the lower portion of said tank separated from said concentrating zone by said first wall, said second inclined wall having a lower edge portion closely adjacent the lower portion of said first inclined wall to form a narrow gap therewith, said second inclined wall defining a precipitation zone in said tank for the precipitation of sludge-forming particles from raw water and chemicals and defining with said first inclined wall an upwardly flaring clarifying zone communicating with said precipitation zone through said gap only and communicating with said settling zone in said tank, said precipitation zone being separated from said settling zone by said second inclined wall; a conduit having an opening communicating with said overflow passage and another opening communicating with said sludge concentrating zone in a lower portion thereof for overflow of sludge from said clarifying zone to said lower portion of said concentrating zone; means for admitting raw water and chemicals to an upper portion of said precipitation zone for downward flow through said precipitation zone toward said gap; conduit means for withdrawing treated water from said settling zone; and conduit means for withdrawing sludge from the lower portion of said concentrating zone.

2. In a reactor for water purification by means of a suspended floc filter bed, in combination, a tank having an upper portion defining a settling zone; a first annular inclined wall in a lower portion of said tank, said wall having an upper edge portion closely adjacent said tank so as to form a substantially annular sludge overflow passage therewith, and a lower portion spaced from said tank so as to define an annular sludge concentrating zone between said wall and said tank; a second annular inclined wall in said tank and extending into the lower portion of said tank within said first wall, said second inclined annular wall having a lower edge portion closely adjacent the lower portion of said first inclined wall to form a substantially annular narrow gap therewith, said second inclined wall enclosing a precipitation zone in said tank for the precipitation of sludge-forming particles from raw water and chemicals, and defining with said first inclined wall an upwardly flaring annular clarifying zone communicating with said precipitation zone through said gap only, and communicating with said settling zone in said tank, said precipitation zone being separated from said settling zone by said second inclined wall; a conduit having an opening communicating with said overflow passage and another opening communicating with said sludge concentrating zone in a lower portion thereof for overflow of sludge from said clarifying zone to said lower portion of said concentrating zone; means for admitting raw water and chemicals to said precipitation zone for downward flow of fluid through said precipitation zone and said gap into said clarifying zone, and of a portion thereof through said passage into said concentrating zone, so as to pass in said precipitating and clarifying zones from an area of smaller flow cross-section to an area of larger flow cross section; conduit means for withdrawing treated water from said settling zone and from the upper portion of said concentrating zone; and conduit means for withdrawing sludge from the lower portion of said concentrating zone.

3. In a reactor as set forth in claim 2, said first inclined wall being funnel-shaped, and said second inclined wall being bell-shaped.

4. In a reactor as set forth in claim 3, said tank being substantially cylindrical and substantially concentric with said funnel-shaped and said bell-shaped walls.

5. In a reactor as set forth in claim 2, said conduit having respective openings communicating with said overflow passage and said sludge concentrating zone being of annular cross section and said respective openings being substantially annular.

6. In a reactor as set forth in claim 2, said gap having a substantially Venturi-shaped flow section.

7. In a reactor as set forth in claim 2, the cross section of said gap being adjustable.

8. In a reactor as set forth in claim 2, said conduit means for withdrawing treated water from said settling zone including an arcuate conduit portion integral with said upper portion of said tank.

9. In a reactor as set forth in claim 2, said conduit means for withdrawing sludge from the lower portion of said concentrating zone including an arcuate conduit portion integral with said tank in a lower portion thereof.

10. In a reactor as set forth in claim 2, a conduit communicating with said lower portion of said sludge concentrating zone and with said clarifying zone, said conduit including pump means for transferring sludge from said concentrating zone to said clarifying zone.

References Cited in the file of this patent

UNITED STATES PATENTS

| | | |
|---|---|---|
| 2,296,437 | Green | Sept. 22, 1942 |
| 2,348,124 | Green | May 2, 1944 |
| 2,464,617 | Sebald | Mar. 15, 1949 |
| 2,509,683 | Green | May 30, 1950 |
| 2,643,976 | Sebald | June 30, 1953 |

FOREIGN PATENTS

| | | |
|---|---|---|
| 544,086 | Great Britain | Mar. 26, 1942 |